(12) United States Patent
Tine et al.

(10) Patent No.: US 8,838,156 B2
(45) Date of Patent: *Sep. 16, 2014

(54) MULTI-BEARER RATE CONTROL FOR TRANSPORTING USER PLANE DATA

(75) Inventors: Steven D. Tine, Buffalo Grove, IL (US); Tyrone D. Bekiares, Chicago, IL (US); Allan G. Brown, Oswego, IL (US); Trent J. Miller, West Chicago, IL (US); James M. Nowakowski, Buffalo Grove, IL (US); Scott J. Pappas, Lake Zurich, IL (US); Satyanarayana Tummalapenta, Bangalore (IN)

(73) Assignee: Motorola Solutions, Inc., Schaumburg, IL (US)

( * ) Notice: Subject to any disclaimer, the term of this patent is extended or adjusted under 35 U.S.C. 154(b) by 473 days.

This patent is subject to a terminal disclaimer.

(21) Appl. No.: 13/194,299

(22) Filed: Jul. 29, 2011

(65) Prior Publication Data

US 2012/0100879 A1  Apr. 26, 2012

Related U.S. Application Data

(60) Provisional application No. 61/405,913, filed on Oct. 22, 2010.

(51) Int. Cl.
| | |
|---|---|
| *H04W 72/00* | (2009.01) |
| *H04B 7/00* | (2006.01) |
| *H04L 12/26* | (2006.01) |
| *H04B 7/216* | (2006.01) |
| *H04L 12/913* | (2013.01) |
| *H04W 28/26* | (2009.01) |
| *H04L 12/911* | (2013.01) |
| *H04L 12/917* | (2013.01) |
| *H04W 76/02* | (2009.01) |
| *H04W 28/22* | (2009.01) |

(52) U.S. Cl.
CPC ............. *H04W 28/26* (2013.01); *H04L 47/724* (2013.01); *H04L 47/824* (2013.01); *H04L 47/76* (2013.01); *H04W 76/025* (2013.01); *H04W 28/22* (2013.01)
USPC ........... 455/464; 455/450; 455/509; 370/230; 370/329

(58) Field of Classification Search
CPC ... H04W 28/26; H04W 28/22; H04W 76/025; H04W 72/1231; H04W 72/00; H04W 48/06; H04W 40/02; H04W 40/246; H04W 28/0268; H04W 28/0252; H04W 24/02; H04L 47/724; H04L 61/2564; H04L 65/80; H04L 45/00; H04L 41/0806; H04L 41/0856; H04L 41/0896; H04L 41/5003
USPC ................. 455/464, 450, 509, 512, 452, 453; 370/329, 341, 431, 389, 401, 230, 423, 370/468, 252; 709/217–230
See application file for complete search history.

(56) References Cited

U.S. PATENT DOCUMENTS

| | | |
|---|---|---|
| 5,563,882 A | 10/1996 | Bruno et al. |
| 6,668,175 B1 | 12/2003 | Almgren et al. |
| 6,674,733 B1 | 1/2004 | Huusko |
| 7,107,054 B2 | 9/2006 | Florkey et al. |
| 7,197,328 B2 | 3/2007 | Hart et al. |
| 7,339,950 B2 * | 3/2008 | Nielsen et al. ................ 370/468 |
| 7,359,710 B2 | 4/2008 | Benco et al. |
| 7,436,827 B2 | 10/2008 | Greis et al. |
| 7,929,466 B2 | 4/2011 | Tillotson |
| 8,266,296 B2 | 9/2012 | Dowling et al. |
| 8,305,922 B2 | 11/2012 | Cuervo |
| 8,346,161 B2 | 1/2013 | Sogabe et al. |
| 8,433,794 B2 | 4/2013 | Baniel et al. |
| 2002/0054597 A1 | 5/2002 | O'Toole et al. |
| 2003/0093459 A1 | 5/2003 | Dowling et al. |
| 2006/0104296 A1 | 5/2006 | Rodrigo |
| 2007/0217435 A1 | 9/2007 | Crocker et al. |
| 2008/0049614 A1 * | 2/2008 | Briscoe et al. ................ 370/230 |
| 2008/0123660 A1 | 5/2008 | Sammour et al. |
| 2008/0144615 A1 * | 6/2008 | Casey ........................... 370/389 |
| 2009/0070469 A1 | 3/2009 | Roach et al. |
| 2009/0086705 A1 | 4/2009 | Zsisimopoulos et al. |
| 2009/0116440 A1 | 5/2009 | Zhao et al. |
| 2009/0168646 A1 | 7/2009 | Wang et al. |

| | | |
|---|---|---|
| 2009/0239526 A1 | 9/2009 | Zhao et al. |
| 2010/0165836 A1 | 7/2010 | Wahlqvist et al. |
| 2010/0232393 A1 | 9/2010 | Shuai et al. |
| 2010/0284299 A1 | 11/2010 | Bl et al. |
| 2011/0075744 A1 | 3/2011 | Laselva et al. |
| 2012/0026970 A1 | 2/2012 | Winters et al. |
| 2012/0027025 A1 | 2/2012 | Bekiares et al. |
| 2012/0046058 A1 | 2/2012 | Vesterinen et al. |
| 2012/0163300 A1 | 6/2012 | Wang et al. |
| 2012/0207120 A1* | 8/2012 | Bark et al. ............... 370/329 |
| 2012/0250509 A1 | 10/2012 | Leung et al. |
| 2012/0250650 A1 | 10/2012 | Brombal et al. |
| 2012/0257499 A1 | 10/2012 | Chatterjee et al. |
| 2012/0263036 A1 | 10/2012 | Barclay et al. |
| 2012/0289232 A1 | 11/2012 | Ostrup et al. |
| 2012/0327779 A1 | 12/2012 | Gell et al. |
| 2013/0044732 A1 | 2/2013 | Hu et al. |
| 2013/0051334 A1 | 2/2013 | Sammour et al. |
| 2013/0055016 A1 | 2/2013 | Charles et al. |
| 2013/0094483 A1 | 4/2013 | Mariner et al. |
| 2013/0294372 A1 | 11/2013 | Ishii et al. |

FOREIGN PATENT DOCUMENTS

| | | | |
|---|---|---|---|
| EP | 1701487 | A1 | 9/2006 |
| EP | 2124386 | A1 | 11/2009 |
| WO | 2005096655 | A1 | 10/2005 |
| WO | 20080116502 | A1 | 10/2008 |

OTHER PUBLICATIONS

PCT International Search Report Dated Nov. 7, 2011 for Related U.S. Appl. No. 13/194,378.
Naim G. et al. "Enhancements to QOS Management for Real Time Radio Bearers in 3G Cellular Systems", Wireless Communications and Networking Conference, 2000, WCNC, 2000, IEEE Sep. 23-28, 2000, Piscataway, NJ; vol. 3, p. 1547-1551, XP010532780; ISBN:978-0-7803-6596-4.
PCT International Search Report Dated Dec. 23, 2011.
3rd Generation Partnership Project: Technical Specification Group Services and System Aspects; General Packet Radio Service (GPRS) Enhancements for Evolved Universal Terrestrial Radio Access Network (E-UTRAN) Access (Release 10), 3GPP Standard; 3GPP TS 23.401, Mobile Competence Centre; France; No. V10.1.0; Sep. 29, 2010, p. 1-271; XP050442333.
International Search Report and Written Opinion for related International Application No. PCT/US2011/046044 mailed on Nov. 7, 2011.
Naim G. et al. "Enhancements to QOS Management for Real Time Radio Bearers in 3G Cellular Systems", Wireless Communications and Networking Conference, 2000, WCNC, 2000, IEEE, Sep. 23-28, 2000, vol. 3, pp. 1547-1551.
International Search Report and Written Opinion for International Application No. PCT/US2011/53355 mailed on Dec. 23, 2011.
"3rd Generation Partnership Project: Technical Specification Group Services and System Aspects; General Packet Radio Service (GPRS) Enhancements for Evolved Universal Terrestrial Radio Access Network (E-UTRAN) Access (Release 10)," 3GPP TS 23.401, Mobile Competence Centre, Sep. 29, 2010, No. V10.1.0, pp. 1-271.
Non-Final Rejection mailed May 23, 2013 in U.S. Appl. No. 13/194,378, Tyrone D. Bekiares, filed Jul. 29, 2011.
International Preliminary Report on Patentability and Written Opinion for International Patent Application No. PCT/US2011/046044 issued Feb. 5, 2013.
International Preliminary Report on Patentability and Written Opinion for International Patent Application No. PCT/US2011/053355 issued Apr. 23, 2013.
FRF.16.1 Multilink Frame Relay UNI/NNI Implementation Agreement; Frame Relay Forum Technical Committee; May 2002; 40 Pages.
Final Rejection mailed Sep. 18, 2013 in U.S. Appl. No. 13/194,378, Tyrone D. Bekiares, filed Jul. 29, 2011.
ETSI, GSM 05.05, Radio Transmission and Reception, Mar. 1996.
"3rd Generation Partnership Project; Digital cellular telecommunications system (Phase 2+); Universal Mobile Telecommunications System (UMTS); LTE; Quality of Service (Qos) concept and architecture (3GPP TS 23.107 version 9.0.0 Release 9)," Technical Specification, Jan. 2010, pp. 1-42.
"3rd Generation Partnership Project; Technical Specification Group Service (GPRS) enhancements for Evolved Universal Terrestrial Radio Access Network (E-UTRAN) access (Release 9)," (3GPP TS 23.401 version 9.2.0 Release 9), Technical Specification, Oct. 2009, pp. 1-247.
"3rd Generation Partnership Project; Universal Mobile Telecommunications System (UMTS); LTE; Non-Access-Stratum (NAS) Protocol for Evolved Packet System (EPS); Stage 3," (3GPP TS 24.301 version 9.1.0 Release 9), Technical Specification, Jan. 2010, pp. 1-273.
"3rd Generation Partnership Project; Digital cellular telecommunications system (Phase 2+); Universal Mobile Telecommunications System (UMTS); LTE; Policy and charging control signalling flows and Quality of Service (QoS) parameter mapping," (3GPP TS 29.213 version 9.1.0 Release 9), Technical Specification, Jan. 2010, pp. 1-129.
"3rd Generation Partnership Project; Universal Mobile Telecommunications System (UMTS); LTE; 3GPP Evolved Packet System (EPS); Evolved General Packet Radio Service (GPRS) Tunnelling Protocol for Control plane (GTPv2-C); Stage 3," (3GPP TS 29.274 version 9.1.0 Release 9), Technical Specification, Jan. 2010, pp. 1-152.
Notice of Allowance mailed Mar. 3, 2014, in U.S. Appl. No. 13/194,378, Tyrone D. Bekiares, filed Jul. 29, 2011.

* cited by examiner

*Primary Examiner* — Nizar Sivji
(74) *Attorney, Agent, or Firm* — Terri H. Smith; Kenneth A. Haas

(57) ABSTRACT

An intermediary function receives a reservation request for a desired throughput from the sourcing device, and determines a set of bearers whose aggregate throughput approximates the desired throughput. The intermediary function requests from at least one access network the set of bearers whose aggregate throughput approximates the desired throughput, and receives from the at least one access network an allocated set of bearers, wherein the allocated set of bearers comprises one or more bearers. The intermediary function informs the sourcing device of an aggregate throughput of the allocated set of bearers, receives user plane data from the sourcing device, and associates the user plane data with the allocated set of bearers in order to transport the user plane data to the receiving device. Subsequent modifications to the allocated set of bearers causes the intermediary function to inform the sourcing device of the modified aggregate throughput of the allocated set of bearers.

6 Claims, 3 Drawing Sheets

MULTI-BEARER RATE CONTROL FOR TRANSPORTING USER PLANE DATA

REFERENCE TO RELATED APPLICATION

The present application is related to the following U.S. applications commonly owned together with this application by Motorola Solutions, Inc.: Ser. No. 13/194,378, filed Jul. 29, 2011, titled "Methods for Bearer Reservation, Maintenance, and Use in a Communication System" by Bekiares, et al.

TECHNICAL FIELD

The technical field relates generally to communication systems and more particularly to methods for bearer reservation, maintenance, and use in a communication system.

BACKGROUND

Use of streaming media technology (e.g. video/IP, voice/IP) is growing across all market segments, inclusive of consumer, enterprise, and public safety. Today, such media is commonly transported over wired or fixed wireless networks. Advances in wireless broadband technology are enabling such media to also be streamed over next generation wireless broadband networks, such as LTE.

Some communication networks, such as Long Term Evolution (LTE), which is a $4^{th}$ generation (4G) of radio technologies that comprises a set of enhancements to the Universal Mobile Telecommunications System (UMTS), which is described in a suite of Technical Specifications (TS) developed within and published by the $3^{rd}$ Generation Partnership Project (3GPP), grant a default bearer to a device upon the device connecting to the network. These default bearers only provide for a "best effort" delivery of all unclassified traffic, inclusive of media streams, with few, if any, guarantees of Quality of Service (QoS). However, some real-time media applications, such as voice, video streaming, etc., need a minimum guaranteed QoS associated with the network bearer used to transport the media in order to present the media to the receiving user with acceptable quality; and to accommodate this need, in addition to providing the default bearer, the network further provides a mechanism that allows requesting an allocation of a bearer having a guaranteed minimum QoS for media transport.

Conventional approaches to bearer reservation attempt to allocate, for a given media stream, a single bearer supporting the required throughput. When the network is congested, however, the allocated bearer may be rescinded. Revocation of the allocated bearer will result in the media stream being redirected to the default bearer, or being blocked altogether, both of which will prove unacceptable to the end user.

Unlike other types of data, the encoded bit rate of streaming media (particularly video) can be varied. That is to say, a sourcing media encoder can vary its output bit rate to match available throughput to a recipient. This allows the quality of the streaming media to gracefully degrade in the presence of network congestion, assuming some feedback mechanism to the encoder is available.

Thus, when an access network becomes congested, there exists a need for a rate control feedback mechanism to vary the bit rate of a stream with the available throughput of the network while still providing the QoS associated with an allocated bearer.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
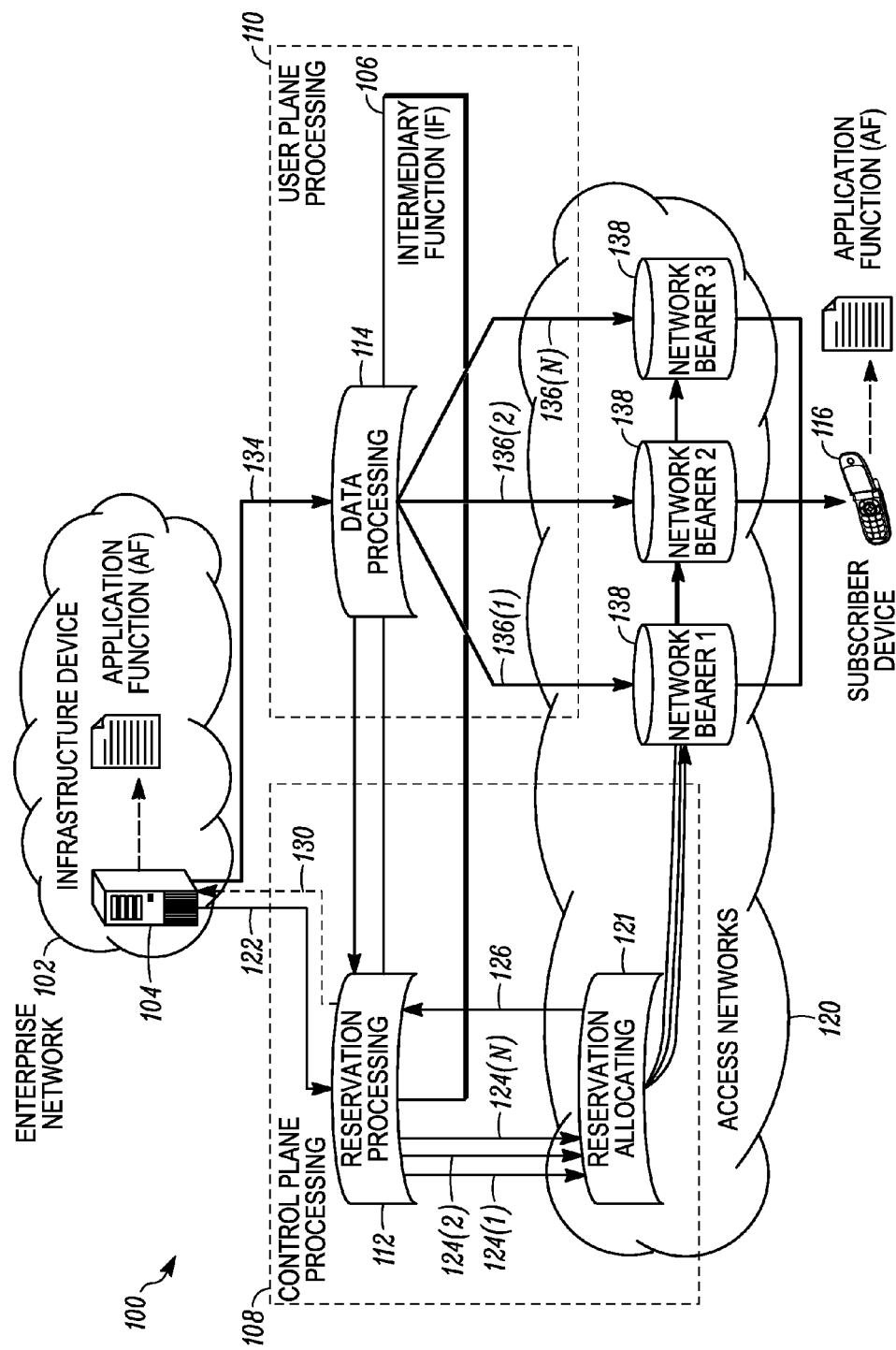
FIG. 1 is a system diagram of a communication system that implements multi-bearer rate control for transporting user plane data, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, an intermediary function performs a method for multi-bearer rate control for transporting user plane data from an application function associated with a sourcing device to an application function associated with a receiving device. In some embodiments, the intermediary function may receive a user plane reservation request for a desired throughput from the sourcing device, and in other embodiments, the intermediary function may receive user plane data from the sourcing device, and use one or more user plane data packets to determine a desired throughput. In all embodiments, however, the intermediary function determines a set of bearers, where the set of bearers determined comprises two or more bearers, whose aggregate throughput approximates the desired throughput. The intermediary function requests from at least one access network the set of bearers whose aggregate throughput approximates the desired throughput, and receives from the at least one access network an allocated set of bearers, wherein the allocated set of bearers comprises one or more bearers. In some embodiments, upon receipt of the allocated set of bearers, the intermediary function may inform the sourcing device of the aggregate throughput of the allocated set of bearers. In all embodiments, the intermediary function receives user plane data from the sourcing device, and associates the user plane data with the allocated set of bearers in order to transport the user plane data to the receiving device. As congestion (or lack of congestion) causes the access network to modify the allocated set of bearers (for example, rescinding reservations, accepting new reservations, lowering the allocated bit rate of an allocated bearer, or raising the bit rate of an allocated bearer, or the like), the sourcing device is informed of a modified throughput of the allocated set of bearers, and adjusts the bit rate at which it is sourcing user plane data (the act of adjusting a bit rate responsive to feedback is often referred to in the art as "rate control"). In some embodiments, the intermediary function may calculate the modified throughput and inform the sourcing device of the modified throughput. In other embodiments, the receiving device may inform the sourcing device of the bearers which are currently allocated, and the sourcing device may calculate the modified throughput.

Referring now to the drawings, and in particular FIG. 1, a system diagram of a communication system that implements multi-bearer rate control for transporting user plane data, in accordance with some embodiments, is shown and indicated generally as system 100. System 100 includes an infrastructure device having an application function (AF) 104, wherein the infrastructure device is part of an enterprise network 102. The AF 104 communicates with an AF 116 residing within a subscriber device, wherein the communication takes place over a set (i.e. one or more) of access networks 120.

An enterprise, as the term is used herein, means an organization having infrastructure devices and users of subscriber devices that communicate using the access networks 120, and can be, for example, a Public Safety enterprise or agency or a commercial enterprise, agency or business. Moreover, an enterprise network generally includes infrastructure devices or equipment, such as servers, running various application functions (e.g. AF 104) at the application layer of the Open System Interconnection (OSI) networking model, Internet Protocol (IP) transport equipment, etc. Examples of AFs 104 include, but are not limited to, Push-To-Talk services, Video-on-Demand services, video surveillance services, telephony services, computer aided dispatch (CAD) services, file transfer services, or other application functions which requires dedicated throughput. In this illustrative scenario, the AF 104 may be a streaming media application.

The subscriber device 116 also includes one or more AFs that can be, for example, Push-To-Talk clients, Video-on-Demand clients, video surveillance clients, telephony clients, CAD clients, file transfer clients, or other application functions which requires dedicated throughput. In this illustrative scenario, the AF 116 may also be a streaming media application. The subscriber device 116, which is also referred to in the art as user equipment, communication devices, access devices, access terminals, mobile stations, mobile subscriber units, mobile devices, user devices, and the like, can be any type of communication device such as radios, mobile phones, mobile data terminals, Personal Digital Assistants (PDAs), laptops, two-way radios, cell phones, and any other device capable of operating in a wired or wireless environment and that can be used by public users (such as commercial users) or private users (such as public safety users).

The access networks 120 can include one or more access networks in any combination that provide the communication resources over which various media (e.g. audio, video, text, etc.) is transported. Examples of such access networks 120 include, but are not limited to, one or more Radio Access Networks (RANs), including RANs operating according to LTE, UMTS, WiFi, WiMAX, EVDO, or any other suitable standard or proprietary access network implementation.

System 100 further includes a control plane processing block 108 that processes control plane packets or messages. System 100 also includes a user data plane processing block 110 that processes user plane data.

System 100 also includes an intermediary function IF 106. IF 106 includes a reservation processing function 112 for receiving, processing and generating control plane messages 122, e.g. messages used to maintain network bearers, to and from a sourcing AF 104, and control plane messages 124 to and from a reservation allocating function 121. The IF 106 further includes a data processing function 114 which receives and processes user plane data 134, e.g. media packets or a media stream, from a sourcing AF 104 and directs said user plane data 136 to one or more network bearers 138.

The IF 106 is a logical element of system 100 which can reside as middleware solely in an infrastructure device, such as the server that includes the AF 104, or solely within a different infrastructure device in the enterprise or in the access networks 120 (e.g. in an LTE Evolved Packet Core (EPC) element (such as an eNodeB, a Packet Data Network Gateway, a Policy and Charging Rules Function) or other access network element), or solely within a different standalone infrastructure device, also referred to as an intermediary device. The IF 106 can also reside as middleware in the subscriber device 116. Finally, the IF 106 can be distributed between some combination of subscriber devices and infrastructure devices.

Figure 2:
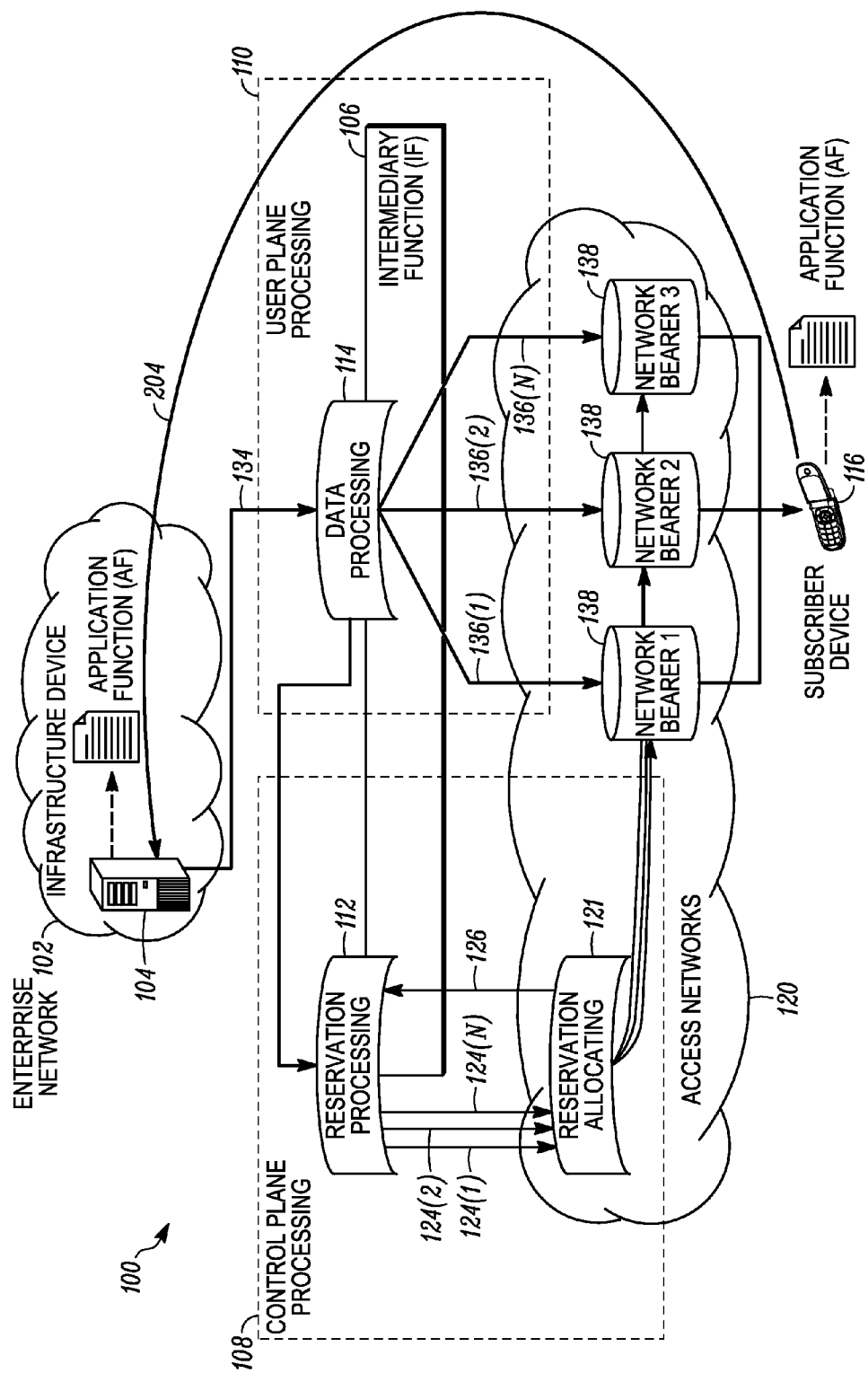
FIG. 2 is a system diagram of a communication system that implements multi-bearer rate control for transporting user plane data, in accordance with another embodiment.

In general, the enterprise infrastructure devices 104 (and its associated AF 104), the access network infrastructure elements (e.g. IF 106), and the subscriber devices 116 (and its associated AF 116), are each implemented using a memory (not shown), one or more network interfaces, and a processing device that are operatively coupled, and which when programmed form the means for these system elements to implement their desired functionality, for example as illustrated by reference to FIG. 1 and FIG. 2. The network interfaces are used for passing signaling between the elements of the system 100. The implementation of the network interface in any particular element/device depends on the particular type of network, i.e. wired and/or wireless, to which the element/device is connected.

Where the network supports wireless communications, the interfaces comprise processing, modulating, and transceiving elements that are operable in accordance with any one or more standard or proprietary wireless interfaces, wherein some of the functionality of the processing, modulating, and transceiving elements may be performed by means of the processing device through programmed logic, such as software applications or firmware stored on the memory device of the system element or through hardware.

The infrastructure device 104, the subscriber device 116 and/or the intermediary device (if independently instantiated) may be partially implemented in hardware and thereby programmed with software or firmware logic or code for performing functionality described by reference to FIG. 1 and FIG. 2; and/or the infrastructure device 104, the subscriber device 116 and/or the intermediary device (if independently instantiated) may be completely implemented in hardware, for example, as a state machine or application specific integrated circuit (ASIC). The memory implemented by these devices can include short-term and/or long-term storage of various information needed for the functioning of the respective devices. The memory may further store software or firmware for programming the device with the logic or code needed to perform its functionality.

Also an understanding of some of the terms used herein will assist in understanding the teachings in accordance with the present disclosure. As used herein, the term bearer or bearer resource is defined as a transmission path in a network (such as a RAN) and is used to carry user plane data (also termed, herein, as communications, media packets, media streams, or service data flows (SDFs)). A bearer can be bidirectional, i.e., having both an uplink path from the subscriber device to the infrastructure device and a downlink path from the infrastructure device to the subscriber device; or a bearer can be unidirectional, i.e., having either an uplink path from the subscriber device to the infrastructure device or a downlink path from the infrastructure device to a single subscriber device (point-to-point (PTP)) (such as a allocated bearer or a default bearer) or to a group of subscriber devices (point-to-multipoint (PTM)) for broadcast or multicast traffic. A bearer has associated therewith a set of QoS characteristics or attributes such as, but not limited to, a particular throughput, bit rate, scheduling priority, admission priority, maximum latency, maximum packet loss rate, etc. The priority level of a bearer may be ultimately determined or quantized based on one or more QoS parameters. In the case of a LTE network, such QoS parameters may include the Allocation and Retention Priority (ARP) and QoS Class Identifier (QCI), which are typically specified in a set of policy rules (e.g. Policy and Charging Control (PCC)) rules.

One type of bearer is a Guaranteed Bit Rate (GBR) bearer. A GBR bearer provides a minimum guaranteed throughput (in terms of bits-per-second). The GBR bearer may also be associated with a maximum bit rate, which is greater than or equal to the minimum guaranteed throughput. The network may attempt to guarantee the maximum bit-rate in non-congested situations. A GBR bearer may also be associated with other characteristics, such as a maximum packet-loss-rate, packet latency, and scheduling priority. Another type of bearer is a non-GBR bearer which, when allocated, provides other quality guarantees, such as priority and/or maximum latency, but does not guarantee available throughput. A default bearer is defined as a non-GBR bearer that provides for "best effort" transmission and is allocated to a subscriber device for the duration of its attachment to the access networks 120. By default, any user plane data that is not transferred across an allocated bearer is transferred across the default bearer. A dedicated or allocated bearer is defined as any additional bearer that is established for that same subscriber device and is specifically requested by (or on behalf of) the device and can be either non-GBR or GBR.

A sourcing AF (e.g. AF 104) is defined as an AF that provides user plane data to the data processing function 114 of the IF 106. In some embodiments pursuant to this invention, a sourcing AF also exchanges control plane messages either directly or indirectly (i.e. routed through another application function, acting on behalf of the sourcing AF) with the reservation processing function 112 of the IF 106. A receiving AF (e.g. AF 116) is defined as the AF that receives the user plane data, e.g. media packets, from the sourcing AF. In some embodiments disclosed herein (e.g. as shown in FIG. 1), the sourcing AF 104 resides in an infrastructure device in the enterprise network, and the receiving AF 116 correspondingly resides in a subscriber device. In other embodiments disclosed herein, but not depicted in the figures, the sourcing AF resides in the subscriber device, and the receiving AF correspondingly resides in the infrastructure device in the enterprise network. It should also be noted that in yet other embodiments, the controlling AF and the sourcing AF may reside in the same device.

Turning now to a description of the signaling passed between devices in system 100 to reserve and manage a plurality of bearers for transporting media from a sourcing AF (shown in FIG. 1 as the infrastructure device 104) to a receiving AF (shown in FIG. 1 as the subscriber device 116). It should be noted that any suitable signaling (standardized, proprietary, or some combination of the two) can be realized to implement the control plane and user plane signaling dependent on the protocol and the access networks used by the devices in the system. When the proposed disclosure is realized in a LTE network, the interface from the sourcing AF to the reservation processing function 112 of the IF 106 may conform to the Rx signaling standard. The interface from the reservation processing function 112 of the IF 106 to the reservation allocation function 121 in the access networks 120 for the purpose of managing network bearers may conform to the Rx signaling standard. In a LTE network, the reservation allocation function 121 may be a PCRF. As such, in some embodiments, the process of requesting a bearer allocation between the IF and the LTE network may follow standard LTE bearer request behavior. Accordingly, the IF may not explicitly request the bearer allocation, but rather implicitly request it from the PCRF per standard Rx interface behaviors.

In various embodiments of this the present disclosure, messages 122, 124, 126 and 130 can be carried over Diameter messages such as, but not limited to, Application Authorization Request (AAR), Application Authorization Answer (AAA), Re-Authorization Request (RAR), Re-Authorization Answer (RAA), Credit Control Request (CCR), Credit Control Answer (CCA) etc., with appropriate Attribute Value Pairs (AVPs) to include the relevant information, such as information pertaining to requested bearer (QoS attributes, throughput requirement, Flow Identification etc.), status of a request, status of a bearer, failure to establish a given bearer, rescinding of a given bearer, modification of a given bearer, etc.

In accordance with some embodiments pursuant to the present disclosure, when the AF 104 wants to send user plane data, the AF 104, or a node which is acting on behalf of the AF 104, transmits a user plane reservation request 122 to the reservation processing function 112 of the IF 106. From the perspective of the sourcing AF, the user plane reservation request 122 is for a flow of user plane data, optionally having sufficient QoS, to transport the user plane data from the sourcing AF 104 to the receiving AF 116 using the access networks 120. This request includes a desired or minimum throughput, and may optionally include a maximum bit rate, with or without a preferred number of intermediary bit rates in between the minimum/desired and maximum bit rates. In one illustrative example, the AF 104 makes a user plane reservation request to an IF 106 in the network for a minimum bit rate of 150 kb/s, a maximum bit rate of 700 kb/s, and intermediary bit rates at 200, and 350 kb/s. The IF 106 may determine maximum bit rate and intermediate bit rates, if not explicitly specified, based upon configuration data or interpolated from current or historical analysis of user plane data.

Upon receiving the user plane reservation request 122, the reservation processing function 112 can determine a set of bearers, wherein the determined set of bearers comprises at least two bearers, wherein each bearer provides a certain bit rate or throughput of service, and wherein the aggregate throughput of the bearers approximates a desired throughput for the user plane data from a sourcing AF 104 to a receiving AF 116. Moreover, the bit rates of each bearer may be selected such that the aggregate throughput of a certain combination of bearers can generate any of the desired intermediate bit rates. In one illustrative example, the IF 106 determines a set of N bearers, where N is the requested number of intermediate bits rates (i.e. 200 kb/s and 350 kb/s) implicitly or explicitly determined from the user plane reservation request plus a value of one. The bit rate of one bearer (i.e. 150 kb/s), optionally associated with the highest priority, is requested to be the minimum bit rate specified by the sourcing AF 104. The IF 106 then selects appropriate bit rates (i.e. 200 kb/s and 350 kb/s) for the remaining bearers (optionally associated with successively decreasing priorities) such that the aggregate sum (i.e. 700 kb/s) of the bit rates of the set of bearers is equal to the maximum bit rate.

To affect the order in which the allocated bearers are rescinded or reinstated, bearers may be requested with specific priorities. The first (highest priority) bearer may be marked as being not vulnerable to preemption (i.e. to ensure it remains allocated, if possible), along with the ability to preempt other bearers marked as vulnerable to preemption (i.e. indicating the first bearer should preempt other preemptable bearers, such as secondary, tertiary, and lower priority bearers of other user plane data). Other secondary, tertiary, and lower priority bearers may be marked as being vulnerable to preemption (i.e. indicating that the first bearers of other user plane data may preempt this bearer, if necessary). In addition, bearer priority can be specified in multiple dimensions, including "allocation and retention policy" and "scheduling priority." Further, the same 'latency' requirement is imposed on all bearers to ensure that packets arrive on-time, and roughly in order.

Upon determining the number of bit rates and priorities of bearers required to approximate the desired throughput (and other QoS requirements) from the sourcing AF 104 to the receiving AF 116, the IF 106 attempts to reserve the determined set of network bearers. The reservation processing function 112 generates a corresponding number (2 to N) of reservation requests 124 that it sends to the reservation allocation function 121 in one or more access networks in 120. In one embodiment, where the reservation processing function 112 of the IF 106 resides in the enterprise network, and the reservation allocating function 121 of the access network resides in a LTE network element, such as the PCRF, the request 124 is sent over the Rx interface that is defined by the 3GPP standards body. In another embodiment, where the reservation processing function 112 of the IF 106 resides in a LTE network device, such as the PCRF, and the reservation allocating function 121 of the access network 120 resides in another LTE network device, such as the Packet Data Network Gateway, the request 124 is sent over the Gx interface that is defined by the 3GPP standards body.

Thus, each reservation request 124 is for a single bearer resource in one of the access networks, wherein all of the reservation requests 124 can be directed to the same access network or to a combination of different access networks. Turning again to the example implementation started above, the IF 106 attempts to reserve N=3 bearers, with B1: 150 kb/s, B2: 200 kb/s, B3: 350 kb/s, where B1 is associated with a highest priority, B2 a lower priority, and B3 with a lowest priority.

In response to receiving the bearer reservation requests 124, the reservation allocating function 121 of the access network(s) 120 indicates through signaling 126 to the reservation processing function 112 how many, if any, of the requested bearers have been allocated (i.e. the allocated set of bearers). Please note that the desired number of bearers versus the allocated number of bearers may not be equal, dependent on network capacity at the time the user plane reservation request is processed. The IF 106 then uses any suitable method to determine whether the allocated set of allocated bearers adheres to a configured policy (which may be inclusive of the QoS requirements specified in the user plane reservation request 122). If the allocated set of bearers meets the above policy, the IF 106 accepts and processes the user plane reservation request 122. If the set of allocated bearers does not meet the above policy, the IF 106 will reject the user plane reservation request 122. Obviously, if the access network grants the bearer reservation requests 124 in their totality, the policy is met. The IF 106 responds to the AF's user plane reservation request with notification of the total throughput successfully allocated (e.g. the aggregate sum of the bit rates of the bearers successfully allocated). In the running example, the IF 106 reports back to the AF 104 that the total amount of throughput presently allocated for the user plane data is 350 kb/s (B1: 150 kb/s+B2: 200 kb/s=350 kb/s; the network was unable to, at present, allocate B3: 350 kb/s).

When a plurality of bearers is allocated in response to the reservation requests 124 and the user plane reservation request 122 is accepted, this results in the reservation processing function 112 establishing bearers 1 to N 138 in the appropriate access networks 120. A single flow of user plane data (e.g. an encoded stream of media packets) from a sourcing AF is then split for traversal across this plurality of allocated bearers. When the user plane data 134 are received at the IF 106, it determines that N dedicated bearers are currently allocated. Pursuant with some embodiments, the data processing function 114 first divides or de-multiplexes the received user plane data into a plurality of packet sub-streams 136. The IF 106 maps the plurality of packet sub-streams 136 onto the plurality of allocated bearers 138 such that each of the allocated bearers 138 transports a single packet sub-stream 136 to the subscriber device 116. To facilitate this, the IF 106 will associate certain packets from the sourcing AF with certain allocated bearers. This association may be performed via any number of means, for example, randomly (e.g. every other packet), intelligently based on the perceived contribution of the packet to the reproduced media quality, or it may be performed based on explicit packet markings as noted by the sourcing AF.

At some subsequent time, one or more access networks 120 may rescind or modify the bit rate of one or more of the allocated bearers and provide an indication that is received in the reservation processing function of the IF 106. If a requested network bearer is not initially allocated, or when an allocated bearer is rescinded, the IF 106 may attempt to continually restart the rescinded bearer on behalf of the AF 104 without requiring intervention from the AF. As network conditions change, the IF 106 recalculates the total aggregate throughput across the currently allocated bearers. Pursuant to the current embodiment, the IF 106 may explicitly inform the AF 104 of the updated total throughput available (e.g. the aggregate sum of the bit rates of the bearers currently successfully reserved or allocated). With the knowledge of the total available throughput, the sourcing AF 104 can vary its output bit rate appropriately.

In our example, as network conditions change, B2: 200 kb/s may be rescinded, causing the IF 106 to report to the AF 104 that the total allocated throughput to the receiving AF 116 is now 150 kb/s (B1 only). In an embodiment, the IF 106 may continually attempt to restore rescinded bearers; at some point in time B2: 200 kb/s and B3: 350 kb/s are restored, and the IF 106 reports to the AF 104 that the full 700 kb/s is allocated (B1: 150 kb/s+B2: 200 kb/s+B3: 350 kb/s=700 kb/s).

Optionally, since the sourcing AF 104 is determining its output bit rate dependent on the reservation status of the access network bearers, the IF 106 could effectively "control" how much throughput a given AF 104 is using by forcibly reserving/rescinding bearers, as appropriate. One could imagine an external Computer Aided Dispatch (CAD) or other information management system which in turn instructs the IF 106 to reserve/rescinded bearers based on, for example, incident type or priority. This would be one way of automatically varying, for example, video quality based on a public safety incident designation.

The IF 106 manages this plurality of allocated bearer reservations as a logical group, linked to the AF's 104 user plane reservation request. Changes to the AF's 104's user plane reservation request (including a request for its removal) may affect some or all of the linked set of allocated network bearers.

In the embodiment illustrated by reference to FIG. 1, the feedback to the sourcing AF 104 indicating the total allocated throughput was received from an IF 106. In accordance with another embodiment illustrated by reference to FIG. 2, the receiving device (e.g. the subscriber device 116) sends the feedback regarding the total allocated throughput to the sourcing AF 104. The system 100 shown in FIG. 2 is identical to the one shown in FIG. 1, and the description of which will not be repeated here for the sake of brevity. Further, the operation is largely the same, and as such, only the differences will be described for the sake of brevity.

In this alternate embodiment, there is no communication path available between the AF 104 and the IF 106 to facilitate allocation or status indication of network bearers. In this case, the IF 106 may be pre-configured with a table of desired throughputs for a set of known sourcing AFs. Receipt of a user plane data from AF 104 selects a corresponding desired or minimum throughput value, and optionally a maximum and intermediate throughput values (e.g. B1: 150 kb/s, B2: 200 kb/s, and B3: 350 kb/s). As before, the IF 106 may determine the optional throughput values, as necessary.

As in the first embodiment described, upon determining the number of bit rates and priorities of bearers required to approximate the desired throughput (and other QoS requirements) from the sourcing AF to the receiving AF, the IF 106 attempts to reserve the determined set of network bearers. The reservation processing function 112 generates a corresponding number (2 to N) reservation requests 124 that it sends to the reservation allocating function 121 in one or more access networks in 120. Processing of the reservations is handled in the same way as the embodiments described above.

In this alternate embodiment, it is assumed that the sourcing AF 104 is aware of the number of bearers requested and their associated bit rates. A sourcing AF 104 may label each packet (e.g. by way of an extended RTP header) in such a way as to identify the intended bearer, "filling" each bearer with user plane data from its output bit stream with the maximum number of bits/sec allocated to the bearer. The packets may be marked in such a way that the markings are visible and unaltered from the perspective of the receiving AF. The IF 106 may use these same markings to associate packets to the correct network bearers (alternatively it may use another labeling system, such as DSCP value).

Notably, the sourcing AF may generate a low bit rate stream of "test" data (meaning that the data has a lower speed than the meaningful user plane data, and that the data is not required by the receiving AF to properly decode the meaningful user plane data) and labels it for traversal across bearers which it believes to be rescinded or not currently allocated. This enables the AF 104 to force or cause the IF 106 to attempt reallocation of rescinded bearers, and it serves as a means for detecting (at the receiving AF) when the bearers have been reallocated. To enable this, it is necessary that the IF 106 adhere to a policy which prevents this "test" data from being redirected onto the default best effort bearer if the associated bearer has been rescinded. Doing so would confuse the receiving AF, since it would be unable to determine if a given bearer was actually reallocated, or if the low speed "test" data was instead redirected to the default best effort bearer.

The receiving AF 116 may then employ a reactive feedback mechanism 204, like an extended version of Real Time Control Protocol (RTCP) as specified in Internet Engineering Task Force Request for Comments 3550 dated July 2003, to indicate to the sourcing AF 104 upon which bearers user plane data packets are currently being received. In this way, the sourcing AF can determine which bearers are currently reserved/rescinded and coupled with the knowledge of the bit rates allocated to each bearer, the sourcing AF can vary its output bit rate appropriately. For example, if the receiving AF informs the sourcing AF 104 that it is no longer receiving user plane data on a previously allocated bearer, the sourcing AF 104 should decrease its output bit rate such that it will not fill the recently rescinded bearer. In its place, the AF should attempt to send "test" data across the rescinded bearer. Doing so will cause the IF 106 to continue to attempt to restart the rescinded bearer. When the receiving AF 116 later informs the sourcing AF 104 that "test" data for a previously rescinded bearer is now being received, the sourcing AF 104 should increase its encoded bit rate to fill the newly reallocated bearer.

Figure 3:
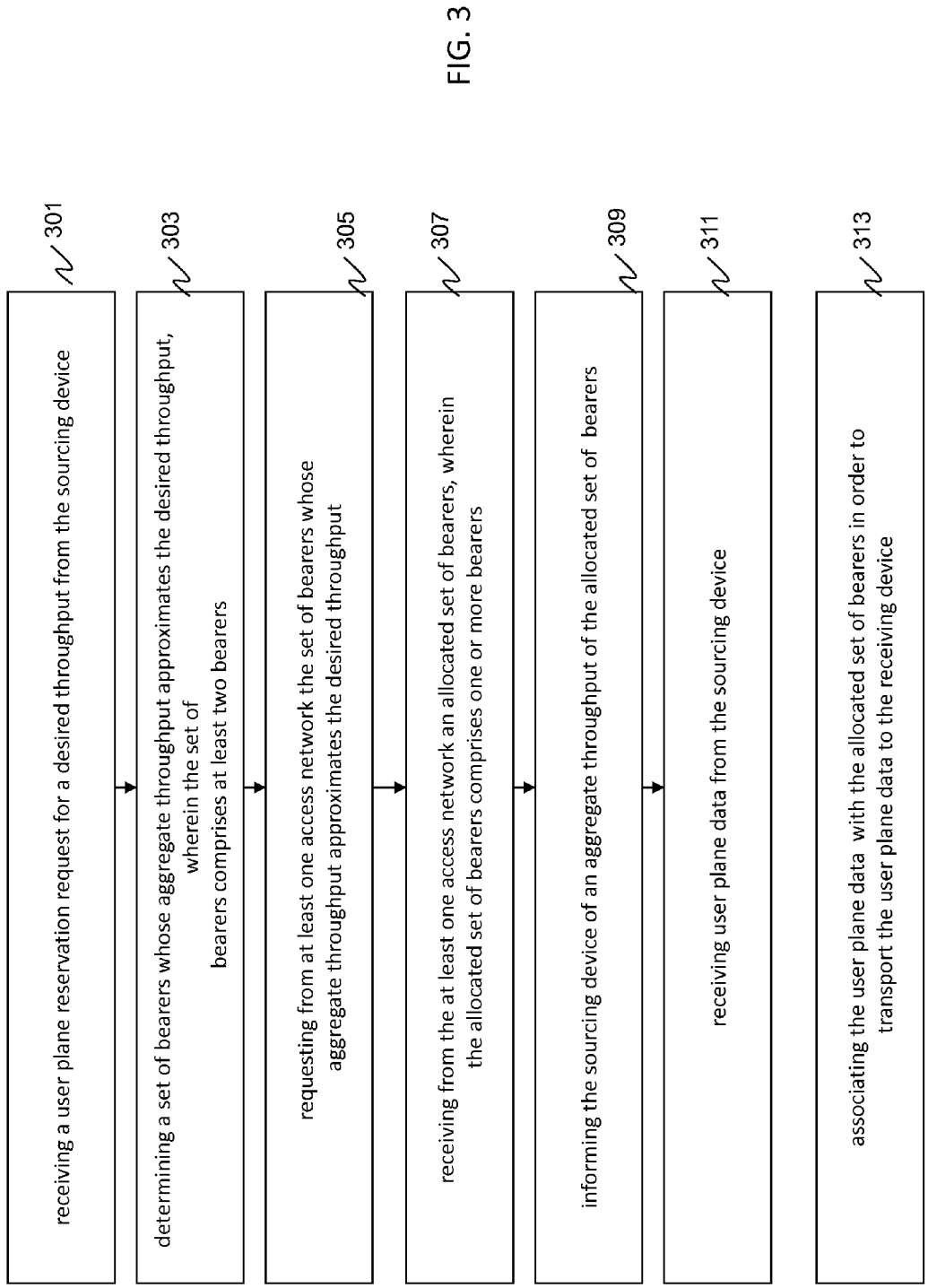
FIG. 3 is a flow chart illustrating operation of the systems of FIG. 1 and FIG. 2.

FIG. 3 is a flow chart showing operation. The steps are as follows:

receiving a user plane reservation request for a desired throughput from the sourcing device (step 301);

determining a set of bearers whose aggregate throughput approximates the desired throughput, wherein the set of the bearers comprised at least two bearers (step 303);

requesting from at least one access network the set of bearers whose aggregate throughput approximates the desired throughput (step 305);

receiving from the at least one access network an allocated set of bearers, wherein the allocated set of bearers comprises one or more bearers (step 307);

informing the sourcing device of an aggregate throughput of the allocated set of bearers (step 309);

receiving user plane data from the sourcing device (step 311); and associating the user plane data with the allocated set of bearers in order to transport the user plane data to the receiving device (step 313).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for bearer reservation, maintenance, and use when one or more requested allocated bearers are unavailable in a communication network described herein. The non-processor circuits may include, but are not limited to, a radio receiver, a radio transmitter, signal drivers, clock circuits, power source circuits, and user input devices. As such, these functions may be interpreted as steps of a method to perform the bearer reservation, maintenance, and use when one or more requested allocated bearers are unavailable in a communication network described herein. Alternatively, some or all functions could be implemented by a state machine that has no stored program instructions, or in one or more ASICs, in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a Read Only Memory (ROM), a Programmable Read Only Memory (PROM), an Erasable Programmable Read Only Memory (EPROM), an Electrically Erasable Programmable Read Only Memory (EEPROM) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for multi-bearer rate control for transporting user plane data from an application function associated with a sourcing device to an application function associated with a receiving device, the method comprising, at an intermediary function, the following steps:
   receiving a user plane reservation request for a desired throughput from the sourcing device;
   determining a set of bearers whose aggregate throughput approximates the desired throughput, wherein the set of bearers comprises at least two bearers;
   requesting from at least one access network the set of bearers whose aggregate throughput approximates the desired throughput;
   receiving from the at least one access network an allocated set of bearers, wherein the allocated set of bearers comprises one or more bearers;
   informing the sourcing device of an aggregate throughput of the allocated set of bearers;
   receiving user plane data from the sourcing device;
   associating the user plane data with the allocated set of bearers in order to transport the user plane data to the receiving device;
   receiving a notification that the number of bearers in the allocated set of bearers has been modified; and
   informing the sourcing device that the aggregate throughput of the allocated set of bearers has been modified.

2. The method of claim 1, wherein the user plane reservation request includes at least one of the following: a minimum bit rate, a maximum bit rate or an intermediate bit rate.

3. The method of claim 1 wherein each bearer in the allocated set of bearers is associated with at least one of the following: a bit rate or a priority.

4. The method of claim 1, further comprising assigning a highest priority to a subset of bearers from the allocated set of bearers whose aggregate bit rate approximately meets a minimum desired bit rate for transporting the user plane data.

5. A method for multi-bearer rate control for transporting user plane data from an application function associated with a sourcing device to an application function associated with a receiving device, the method comprising, at an intermediary function, the following steps:
   receiving a user plane reservation request for a desired throughput from the sourcing device;
   determining a set of bearers whose aggregate throughput approximates the desired throughput, wherein the set of bearers comprises at least two bearers;
   requesting from at least one access network the set of bearers whose aggregate throughput approximates the desired throughput;

receiving from the at least one access network an allocated set of bearers, wherein the allocated set of bearers comprises one or more bearers;

informing the sourcing device of an aggregate throughput of the allocated set of bearers;

receiving user plane data from the sourcing device; and associating the user plane data with the allocated set of bearers in order to transport the user plane data to the receiving device; and receiving a notification that at least one characteristic of at least one bearer in the set of allocated bearers has been modified and informing the sourcing device that the aggregate throughout of the set of allocated bearers has been modified.

6. A method for multi-bearer rate control for transporting user plane data from an application function associated with a sourcing device to an application function associated with a receiving device, the method comprising, at an intermediary function, the following steps:

receiving a user plane reservation request for a desired throughput from the sourcing device;

determining a set of bearers whose aggregate throughput approximates the desired throughput, wherein the set of bearers comprises at least two bearers;

requesting from at least one access network the set of bearers whose aggregate throughput approximates the desired throughput;

receiving from the at least one access network an allocated set of bearers, wherein the allocated set of bearers comprises one or more bearers;

informing the sourcing device of an aggregate throughput of the allocated set of bearers;

receiving user plane data from the sourcing device;

associating the user plane data with the allocated set of bearers in order to transport the user plane data to the receiving device;

further comprising, if the allocated set of bearers provides less than the desired throughput, attempting to increase the aggregate throughput of the allocated set of bearers; and wherein increasing the aggregate throughput of the allocated set of bearers comprises allocating at least one additional bearer to the allocated set of bearers or increasing a bit rate of at least one bearer in the allocated set of bearers.

* * * * *

UNITED STATES PATENT AND TRADEMARK OFFICE
CERTIFICATE OF CORRECTION

PATENT NO.         : 8,838,156 B2
APPLICATION NO.    : 13/194299
DATED              : September 16, 2014
INVENTOR(S)        : Steven D. Tine et al.

It is certified that error appears in the above-identified patent and that said Letters Patent is hereby corrected as shown below:

On The Title Page,

On Page 2, in Item (56), under "OTHER PUBLICATIONS," in Column 2, Line 9, delete "(Qos)" and insert -- (QoS) --, therefor.

In The Specification,

In Column 4, Line 1, delete "IF 106." and insert -- (IF) 106. --, therefor.

In Column 4, Line 62, delete "Also" and insert -- Also, --, therefor.

Signed and Sealed this
Third Day of May, 2016

Michelle K. Lee
*Director of the United States Patent and Trademark Office*